(12) United States Patent
Todoroki

(10) Patent No.: US 10,911,615 B2
(45) Date of Patent: Feb. 2, 2021

(54) SCORING APPARATUS AND NON-TRANSITORY COMPUTER READABLE MEDIUM

(71) Applicant: FUJI XEROX CO., LTD., Tokyo (JP)

(72) Inventor: Hiroshi Todoroki, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 16/558,338

(22) Filed: Sep. 3, 2019

(65) Prior Publication Data
US 2020/0296233 A1    Sep. 17, 2020

(30) Foreign Application Priority Data

Mar. 11, 2019  (JP) .................................. 2019-044306

(51) Int. Cl.
| | |
|---|---|
| *G06F 3/12* | (2006.01) |
| *H04N 1/00* | (2006.01) |
| *G06K 9/34* | (2006.01) |
| *G09B 7/12* | (2006.01) |
| *G09B 7/02* | (2006.01) |

(52) U.S. Cl.
CPC ....... *H04N 1/00331* (2013.01); *G06F 3/1215* (2013.01); *G06F 3/1268* (2013.01); *G06K 9/344* (2013.01); *G09B 7/02* (2013.01); *G09B 7/12* (2013.01)

(58) Field of Classification Search
CPC . H04N 1/00331; G06F 3/1215; G06F 3/1268; G06K 9/344; G09B 7/02; G09B 7/12
See application file for complete search history.

(56) References Cited

U.S. PATENT DOCUMENTS

| | | | | |
|---|---|---|---|---|
| 6,023,342 | A * | 2/2000 | Yanagida | H04N 1/00127 358/1.15 |
| 2014/0160525 | A1 * | 6/2014 | Kikuchi | H04N 1/00923 358/1.15 |
| 2018/0231960 | A1 * | 8/2018 | Kambe | G05B 19/00 |
| 2019/0098143 | A1 * | 3/2019 | Yamaki | H04N 1/00824 |

FOREIGN PATENT DOCUMENTS

| | | |
|---|---|---|
| JP | H07320073 | 12/1995 |
| JP | 2005189705 | 7/2005 |
| JP | 2011138024 | 7/2011 |

* cited by examiner

*Primary Examiner* — Moustapha Diaby
(74) *Attorney, Agent, or Firm* — JCIPRNET

(57) ABSTRACT

A scoring apparatus includes an acquisition unit that acquire an image that is read from a recording medium having an answer column, an instruction unit that provides an instruction to perform a determination on at least one of a correct answer and an incorrect answer from correct answer information related to the recording medium and answer information included in the image acquired by the acquisition unit, a receiving unit that receives determination end information indicating that the determination has ended and determination results on each answer column that has undergone the determination, a notification unit that performs a notification of the determination end information received by the receiving unit, and a controller that performs control to display, before the notification unit has performed the notification, the determination results on the answer column that has undergone the determination.

14 Claims, 8 Drawing Sheets

FIG. 6

| TEST NO. | PROBLEM 1 ||||| CORRECT ANSWER INFORMATION | PROBLEM 2 ||||| PAGE COUNT |
|---|---|---|---|---|---|---|---|---|---|---|---|---|
| | CORRECT ANSWER INFORMATION | SCORING TIME | LOCATION | SCORE | RELATED INFORMATION | | SCORING TIME | LOCATION | SCORE | RELATED INFORMATION | ... | |
| 1 | 4 | 0.1 sec | (80, 10) | 5 | AA | TOMATOES | 0.5 sec | (80, 20) | 7 | DD | ... | 5 |
| 2 | A | 0.1 sec | (50, 10) | 5 | BB | PHOTOSYNTHESIS | 0.5 sec | (50, 20) | 7 | EE | ... | 10 |
| 3 | 2, 4 | 0.1 sec | (70, 10) | 5 | CC | HISTORY | 0.7 sec | (70, 20) | 7 | FF | ... | 7 |
| .. | .. | .. | .. | .. | .. | .. | .. | .. | .. | .. | ... | .. |

34

SCORING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-044306 filed Mar. 11, 2019.

BACKGROUND

(i) Technical Field

The present disclosure relates to a scoring apparatus and a non-transitory computer readable medium.

(ii) Related Art

Japanese Unexamined Patent Application Publication No. 7-320073 discloses an image processing apparatus. The image processing apparatus includes an image reading unit that reads an image from an original document placed on the image reading unit, an image storage unit that stores image information of the image read by the image reading unit, and an image output unit that forms, on a paper sheet placed on the image output unit, an image from the image information stored on the image storage unit and outputs the paper sheet with the image formed thereon. The image processing apparatus further includes a document transport unit that transports the original document from the image reading unit to the image output unit to place the original document on the input output unit and a document processing unit that outputs image information used to form an image on the original document placed on the image output unit in accordance with the image information of the original document read by the image reading unit.

Japanese Unexamined Patent Application Publication No. 2011-138024 discloses an assessment assisting system. The assessment assisting system includes an input unit, an assessment test analyzing unit, and a supplementary-problem generation unit. Each student answers a question of an assessment test and the student's answer is scored. Each student or the guardians of each student use the input unit to input information related to the answer to a score result database that is ready to store the answer. The assessment test analyzing unit analyzes, on a per element basis, the answer of the assessment test input to the score result database. Based on the analysis results of the assessment test analyzing unit, the supplementary-problem generation unit generates a supplementary problem to supplement the element for the student.

Japanese Unexamined Patent Application Publication No. 2005-189705 discloses an information display control apparatus. The information display control apparatus includes a dictionary information storage unit, output unit, answer input unit, true-false determination unit, erroneous entry registration unit, entry display controller, and description information display controller. The dictionary information storage unit stores dictionary information that is a mass of information in which each entry is associated with description information of the entry. The output unit outputs an entry contained in the dictionary information and a predetermined problem that is associated with the entry. The answer input unit inputs an answer to the problem output by the output unit. The true-false determination unit determines whether the answer input by the answer input unit is correct or incorrect. Based on the true-false determination of the true-false determination unit, the erroneous entry registration unit registers the entry responsive to the problem with the answer determined to be incorrect. The entry display controller performs control to display a list of entries registered by the erroneous entry registration unit in a manner that one of the entries is selectable. The description information display controller performs control to display description information corresponding to an entry selected from the list of entries registered by the entry display controller unit.

The scoring apparatus of related art reads that in automatic scoring an answer sheet on which an answer is written in an answer column and is unable to verify scoring results until the whole answer sheet is read and scored.

SUMMARY

Aspects of non-limiting embodiments of the present disclosure relate to providing a scoring apparatus that is able to verify scoring results before scoring an answer column is complete.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.
sure may not address features described above.

According to an aspect of the present disclosure, there is provided a scoring apparatus. The scoring apparatus includes an acquisition unit that acquire an image that is read from a recording medium having an answer column, an instruction unit that provides an instruction to perform a determination on at least one of a correct answer and an incorrect answer from correct answer information related to the recording medium and answer information included in the image acquired by the acquisition unit, a receiving unit that receives determination end information indicating that the determination has ended and determination results on each answer column that has undergone the determination, a notification unit that performs a notification of the determination end information received by the receiving unit, and a controller that performs control to display, before the notification unit has performed the notification, the determination results on the answer column that has undergone the determination.

BRIEF DESCRIPTION OF THE DRAWINGS

Exemplary embodiment of the present disclosure will be described in detail based on the following figures, wherein:

FIG. 6 illustrates an example of test information;

DETAILED DESCRIPTION

Exemplary embodiment of the disclosure is described in detail below with reference to the drawings.

Figure 1:
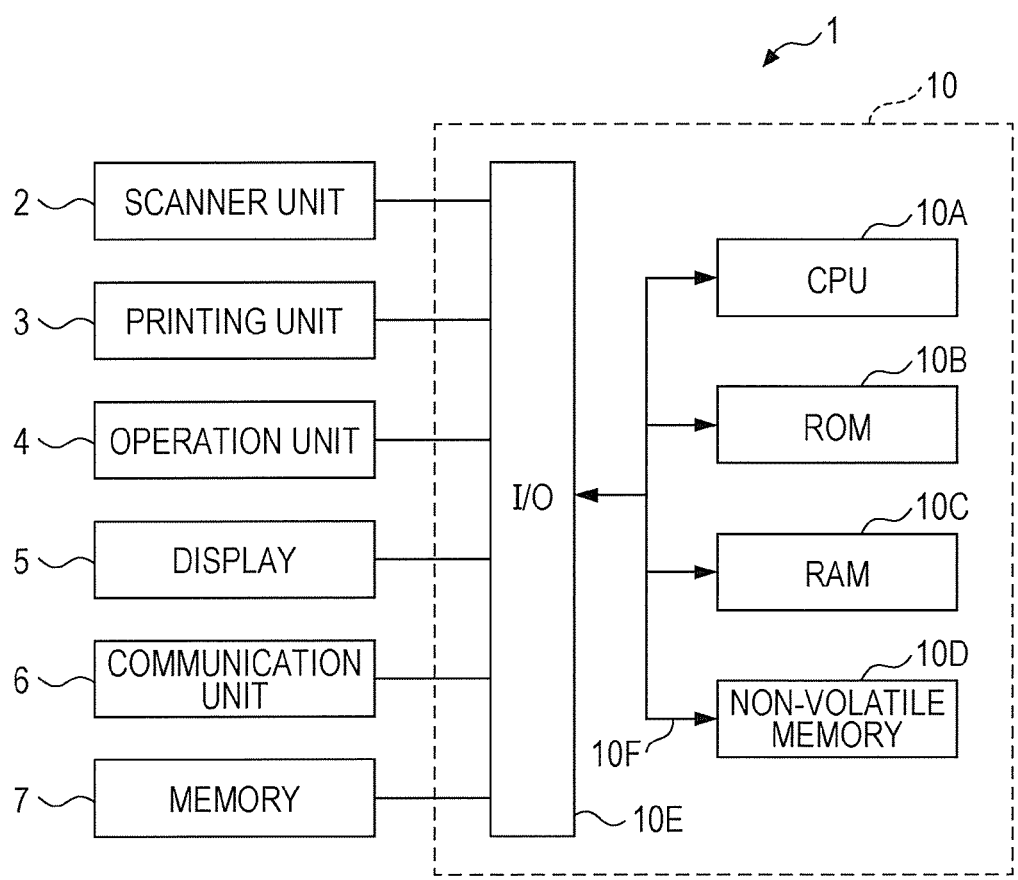
FIG. 1 illustrates a configuration of an image forming apparatus.

FIG. 1 illustrates the configuration of an image forming apparatus 1 of the exemplary embodiment. Referring to FIG. 1, the image forming apparatus 1 includes a scanner unit 2, printing unit 3, operation unit 4, display 5, communication unit 6, memory 7, and image processing unit 10. FIG. 1 does not illustrate a feeder mechanism that feeds recording media, such as paper sheets, a transport mechanism that transports the recording medium, and a discharge mechanism that discharges the recording medium. The image forming apparatus 1 is an example of a scoring apparatus.

The image forming apparatus 1 functions as a multi-function apparatus that has a scanning function to read an original document, a print function to print print data, and a fax transmission function to fax-transmit the image of an original document.

The scanner unit 2 optically reads a recording medium, such as a paper sheet, having an image formed thereon, generates the image, and outputs the image to the image processing unit 10.

The scanner unit 2 has a function of forming an image on a recording medium, such as a paper sheet, via electrophotographic system or ink-jet system. In response to an instruction from the image processing unit 10, the printing unit 3 forms an image on the recording medium.

The operation unit 4 includes operation keys that receive a variety of operations.

The display 5 is a liquid-crystal display and includes a touch panel that receives a variety operations occurring when a user touches the screen of the display 5 with his or her finger.

The communication unit 6 is an interface that performs data communications with an external device.

The memory 7 includes a non-volatile storage device, such as a hard disk, and stores a scoring program to be described below.

The image processing unit 10 includes a central processing unit (CPU) 10A, read-only memory (ROM) 10B, random-access memory (RAM) 10C, non-volatile memory 10D, and input and output interface (I/F) 10E. The CPU 10A, ROM 10B, RAM 10C, non-volatile memory 10D and input and output I/F 10E are connected to each other via a bus 10F. The input and output I/F 10E connects to the scanner unit 2, printing unit 3, operation unit 4, display 5, communication unit 6, and memory 7. The CPU 10A reads the scoring program stored on the memory 7 and executes the read scoring program.

The image forming apparatus 1 has a scoring function to score answers to a test in addition to basic function of the multi-function apparatus, such as a copy function. The scoring function is used to read a recording medium, such as an answer sheet, having an answer column with an answer written thereon and to score the answer to the test from the image of the read answer sheet. The scoring results may be printed on a recording medium, such as a paper sheet, stored onto the memory 7, transmitted to an external device via the communication unit 6, and/or displayed on the display 5. The answer sheet may include the answer column together with the problem or may include only the answer column.

The functional configuration of the CPU 10A in the image forming apparatus 1 that performs a scoring function is described below.

Figure 2:
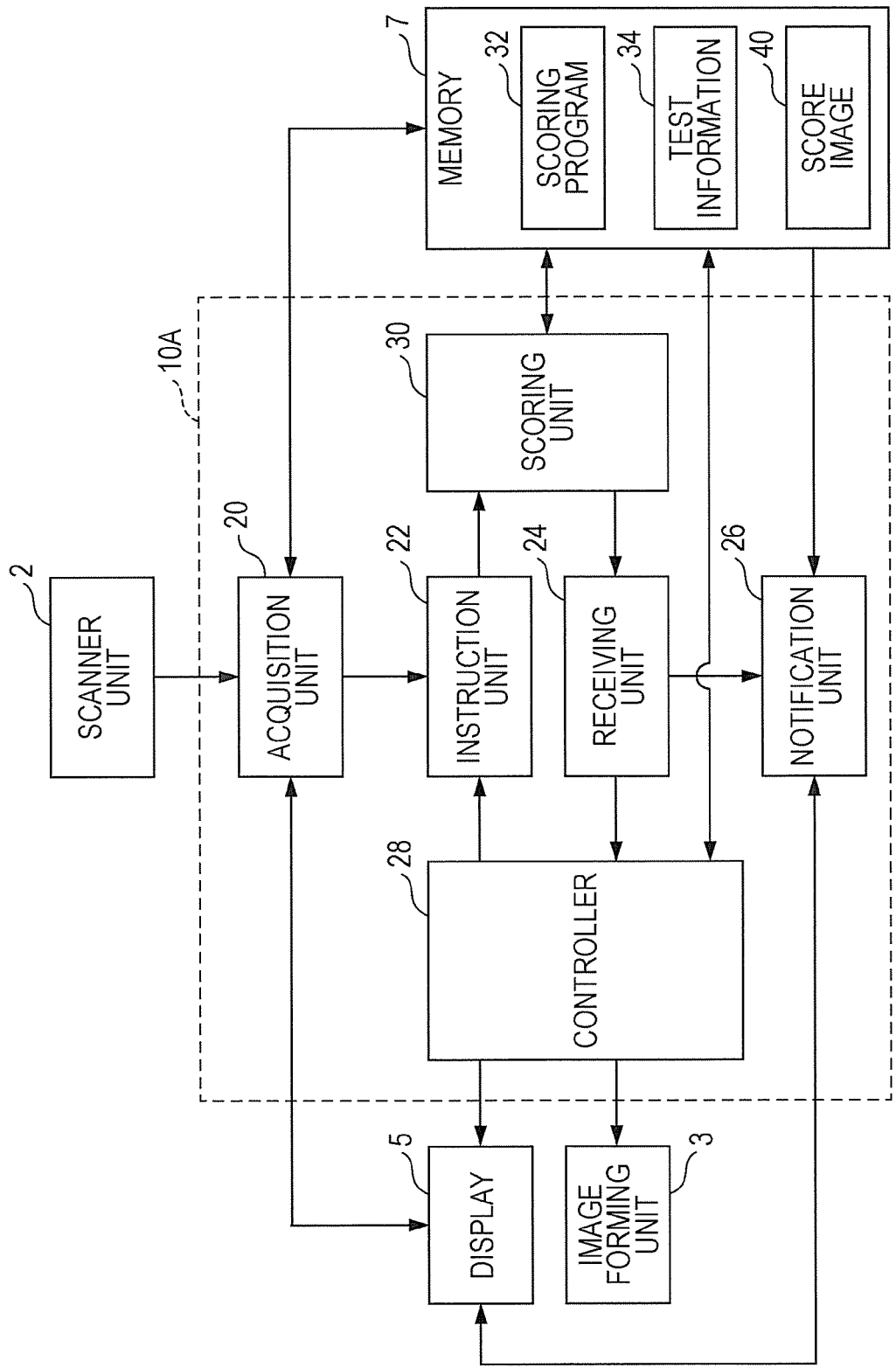
FIG. 2 is a functional block diagram of a central processing unit (CPU)

Referring to FIG. 2, the CPU 10A includes the functions as an acquisition unit 20, instruction unit 22, receiving unit 24, notification unit 26, controller 28, and scoring unit 30.

The acquisition unit 20 acquires the image read from the answer sheet on which the answer is written in the test answer column. The acquisition unit 20 also performs optical character recognition (OCR) on the answer column in the acquired image and acquires answer information representing the answer written on the answer column. The answer information corresponds to the answer the user has written on the answer sheet. The answer method may include at least one of a mark-sheet system, symbol-selection system, and description-type system. In the mark-sheet system, marks of one or more answers are selected from multiple choices are filled. In the symbol-selection system, the symbol of at least one choice selected from multiple choices is selected and written, or is rounded by a circle, or is checked. In the description-type system, words or sentences are freely written.

The instruction unit 22 transmits to the scoring unit 30 the answer information acquired by the acquisition unit 20 and instructs the scoring unit 30 to determine at least one of a correct answer and an incorrect answer from correct answer information related to the answer sheet and the answer information included in the read image acquired by the acquisition unit 20. In accordance with the exemplary embodiment, The instruction unit 22 instructs the scoring unit 30 to determine the correct answer. Alternatively, the instruction unit 22 may instruct the acquisition unit 20 to determine the incorrect answer or the instruction unit 22 may instruct the instruction unit 22 to determine the correct answer and the incorrect answer.

The receiving unit 24 receives from the scoring unit 30 determination end information indicating that the determination is complete and determination results on each answer that has undergone the determination.

The notification unit 26 notifies the controller 28 of the determination end information received by the receiving unit 24.

The controller 28 performs control to cause the display 5 to display the determination results of the answer column that has undergone the determination before the notification unit 26 notifies the determination end information.

Based on the answer information transmitted from the instruction unit 22, the scoring unit 30 determines whether the answer to each problem is correct or incorrect and transmits the determination results to the receiving unit 24. Upon determining the answers to all the problems, the scoring unit 30 transmits to the receiving unit 24 the determination end information indicating that the determination has been completed.

Figure 3:
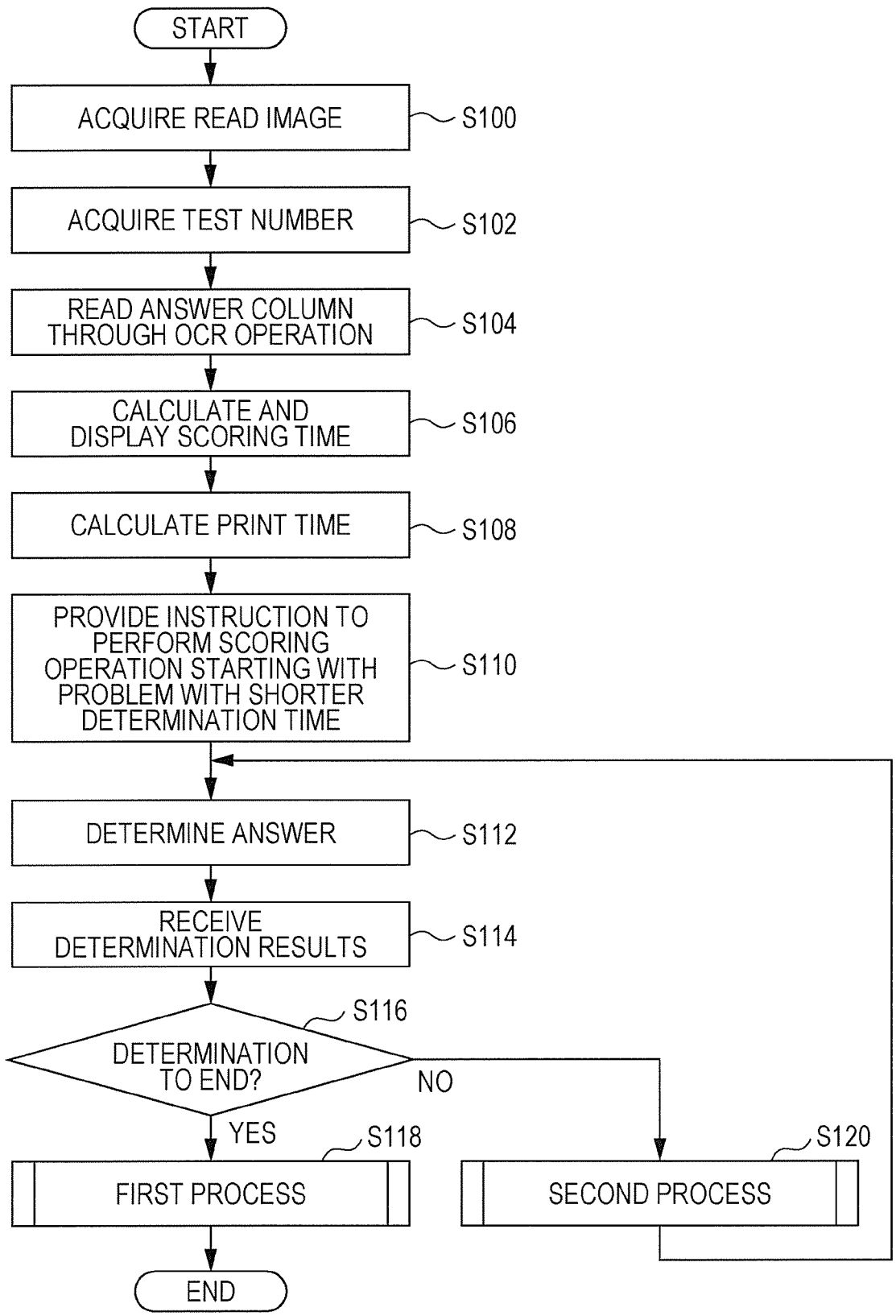
FIG. 3 is a flowchart illustrating a scoring process.
Figure 4:
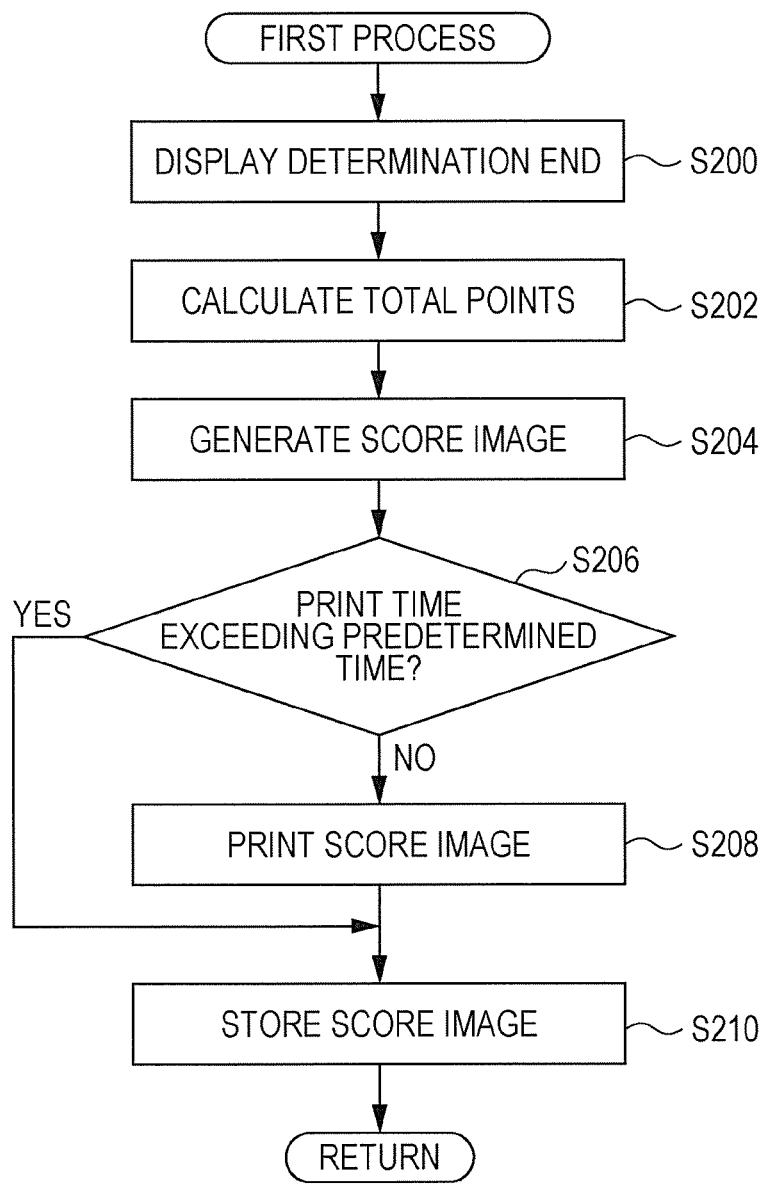
FIG. 4 is a flowchart illustrating a first process.
Figure 5:
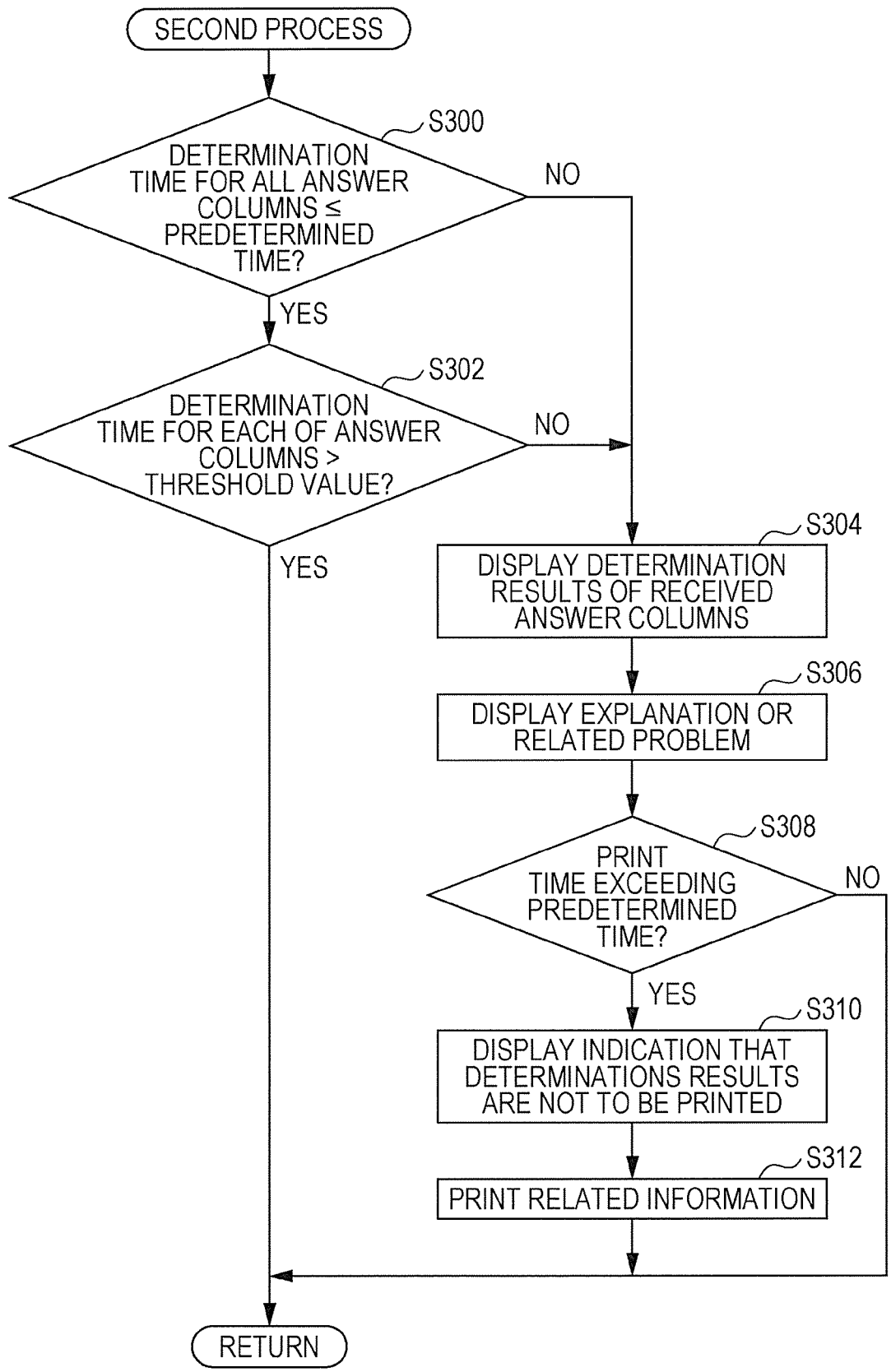
FIG. 5 is a flowchart illustrating a second process.

Referring to FIGS. 3 through 5, the processes of the image forming apparatus 1 of the exemplary embodiment is described. Referring to FIG. 2, a scoring program 32 is stored on the memory 7. The scoring process in FIG. 3 is executed when the CPU 10A reads and executes the scoring program 32. The scoring process in FIG. 3 is performed when a user sets a test paper on the scanner unit 2 and operates the operation unit 4 to instruct the scoring process to be performed.

In step S100, the acquisition unit 20 instructs the scanner unit 2 to read the test paper and acquires the image of the test paper read by the scanner unit 2.

In step S102, the acquisition unit 20 acquires a test number of the test acquired in step S100. The test number is a unique identification number attached to each test on a per type basis. In accordance with the exemplary embodiment, a bar code (not illustrated), such as a QR code (registered trademark) representing the test number, is printed at a predetermined location of the test paper. By analyzing the bar code, the test number is obtained. The test number may be acquired by allowing the user to enter the test number.

In step S104, the acquisition unit 20 performs a character recognition (OCR) operation on the answer column in the image acquired in step S100, and thus acquires the answer information representing the answer written in the answer column. Specifically, the acquisition unit 20 acquires the location of each answer column by referencing test information 34 stored on the memory 7 as illustrated in FIG. 6. The acquisition unit 20 acquires a character string described in the answer column by performing the OCR operation on the answer column arranged at the acquired location.

Referring to FIG. 6, the test information 34 includes a test number, answer information related to the answer to each problem, and corresponding information of the page count of the test. The answer information includes correct answer information, scoring time, location of the answer column, scores, and related information. The related information includes at least one of a problem related to the first problem, application problem, and description of how to address the problem.

In step S106, the acquisition unit 20 references the test information 34, calculates the scoring time of the test having the test number acquired in step S102, and displays the scoring time on the display 5. Specifically, the acquisition unit 20 references the test information 34 and sums the scoring times of all the problems included in the test having the test number acquired in step S102, and then displays the sum on the display 5.

Figure 7:
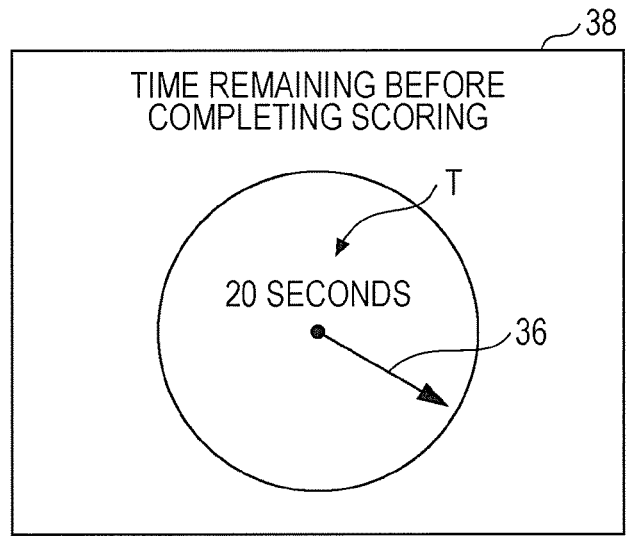
FIG. 7 illustrates an example of a remaining time display image.

The remaining time to the end of the scoring operation may be displayed on a real-time basis on the display 5. Referring to FIG. 7, a remaining time display screen 38 is displayed on the display 5 in a manner such that a second hand 36 turns clockwise with time and the remaining time T to the end of the scoring operation decreases.

The acquisition unit 20 references the test information 34 in step S108 and calculates print time of the test having the test number acquired in step S102. Specifically, by referencing the test information 34, the acquisition unit 20 calculates the print time of the test by multiplying the page count of the test having the test number acquired in step S102 by predetermined print time per page.

In step S110, the instruction unit 22 instructs the scoring unit 30 to score the answer column starting with the type of the answer column having a shorter scoring time per page. Specifically, the instruction unit 22 references the test information 34, reorganize the answer information of each problem acquired in step S104 in the order of shorter scoring time to longer scoring time, and then successively outputs the reorganized answer information to the scoring unit 30.

In step S112, the scoring unit 30 references the test information 34 and determines whether an answer represented by the answer information transmitted from the instruction unit 22 is correct. When all the answers of the problems are determined, the scoring unit 30 transmits the determination end information to the receiving unit 24.

In step S114, the receiving unit 24 receives the determination results from the scoring unit 30.

In step S116, the receiving unit 24 determines whether the determination end information has been received from the scoring unit 30. If the determination end information has been received, processing proceeds to step S118 or otherwise, processing proceeds to step S120.

In step S118, a first process in FIG. 4 is performed.

In step S120, a second process in FIG. 5 is performed.

Referring to FIG. 4, in step S200, the notification unit 26 causes the display 5 to display on the display 5 as the determination end information a message indicating that the determination has been completed.

In step S202, the controller 28 calculates the total point of the scores of the test. Specifically, the controller 28 references the test information 34 and calculates the total point of the scores of the correct answers to problems out of the problems in the text corresponding to the test number acquired in step S102 in FIG. 3.

In step S204, the controller 28 generates a score image that reflects the score results of the read image of the test acquired in step S100. Specifically, a mark indicating a correct answer or an incorrect answer is added to the answer column of each problem in the read image of the test acquired in step S100 in FIG. 3, and an image with the total point of the scores is generated. Concerning an incorrect answer, a re-answer column that allows the user to answer again after the incorrect answer is added in the vicinity of the answer column of the problem. If the re-answer column is added, the location of the re-answer column added is registered in the test information 34 such that the answer written in the re-answer column is determined later.

Figure 8:
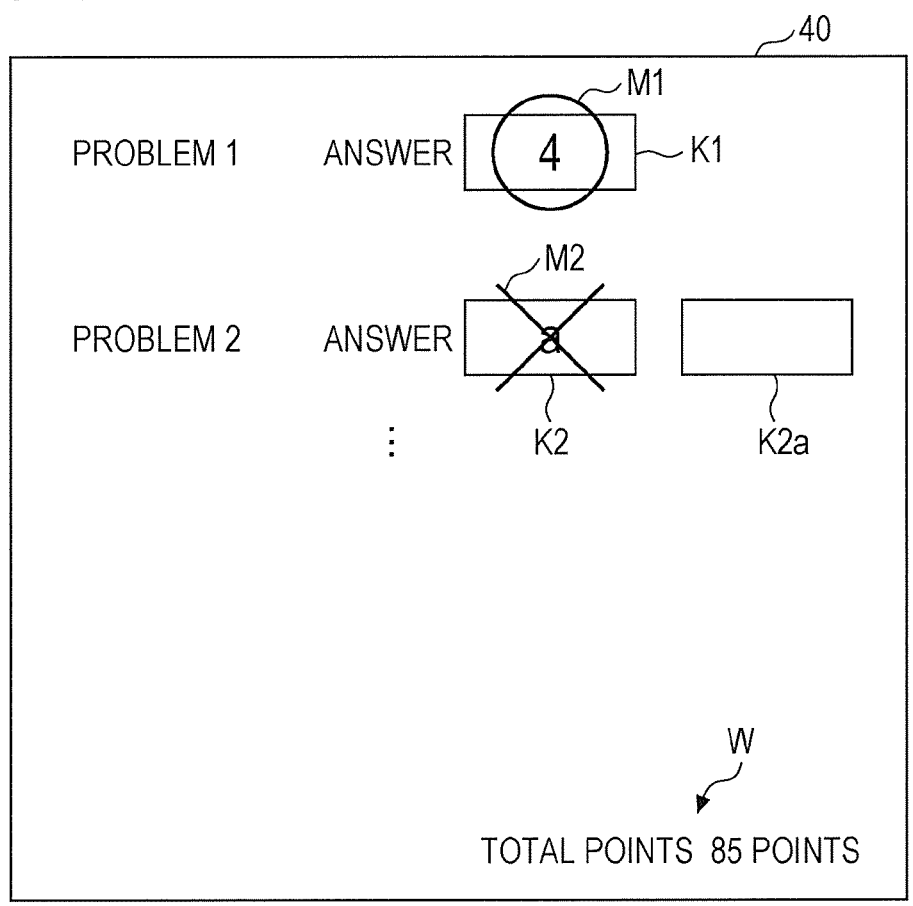
FIG. 8 illustrates an example of a scoring image.

FIG. 8 illustrates an example of the score image. Referring to FIG. 8, in the score image 40, a blank circle as a mark M that indicates a correct answer is added in an answer column K1 of a problem 1 with a correct answer and a letter X as a mark M2 that indicates an incorrect answer is added in an answer column K2 of a problem 2 with an incorrect answer. Further in the score image 40, a re-answer column K2a for re-answering is added in the vicinity of the answer column K2 of the problem 2 with the incorrect answer, namely, to the right of the answer column K2 in FIG. 8. The score image 40 also includes a character string W indicating a total point in the bottom right margin of the answer paper. The mark M1 may be added to only the answer column that includes the correct answer to the problem or the mark M2 may be added to only the answer column that includes the incorrect answer to the problem. The re-answer column image including the re-answer column K2a may be generated separately from the score image 40.

The score image generated thus includes, in addition to the read image of the answer sheet, the marks representing the correct answer and the incorrect answer, the re-answer column of the problem with the answer thereto being incorrect, and the total points of the scores.

In step S206, the controller 28 determines whether the print time calculated in step S108 in FIG. 3 exceeds predetermined time. The predetermined time is set such that the user feels like the waiting time to the end of the printing is too long if the waiting time exceeds the predetermined time.

If the print time does not exceed the predetermined time, processing proceeds to S208. If the print time has exceeded the predetermined time, processing proceeds to step S210.

In step S208, the controller 28 instructs the printing unit 3 to print the score image onto a recording paper sheet. In this way, the score image is printed on the recording paper.

In step S210, the controller 28 causes the memory 7 to store the score image generated in step S204. In this way, the user may be able to instruct the score image to be printed later.

If the print time exceeds the predetermined time, the controller 28 causes the memory 7 to store the score image rather than printing the score image. On the other hand, if the print time is equal to or shorter than the predetermined time, the controller 28 causes the score image to be printed and causes the memory 7 to store the score image.

The second process is described below with reference to FIG. 5.

Referring to FIG. 5, the controller 28 determines in step S300 whether time to determine all the answer columns is equal to or shorter than predetermined time. If the time to determine all the answer columns is equal to or shorter than the predetermined time, an answer column having the determination time longer than a predetermined threshold value out of all the answer columns is set to have time during which control not to display the determination results is desirably performed.

If the determination time of all the answer columns is equal to or shorter than the predetermined time, processing proceeds to step S302. If the determination time of all the answer columns is longer than the predetermined time, processing proceeds to step S304.

In step S302, the controller 28 determines whether the time to determine each of the answer columns is longer than the predetermined threshold value. If the determination time of each of the answer columns is longer than the predetermined value, the predetermined threshold value is set to be a value throughout which control not to display the determination results is desirably performed.

If the time to determine the answer column is longer than the predetermined threshold value, the routine ends and processing returns to step S112 in FIG. 3 to determine the next answer column.

If the time to determine all the answer columns does not exceed the predetermined time, control is performed not to display the determination results for an answer column having a determination time longer than the predetermined threshold value, such as the answer column of the description-type system, among all the answer columns.

If the time to determine the answer column is equal to or shorter than the predetermined threshold value, processing proceeds to step S304.

Figure 9:
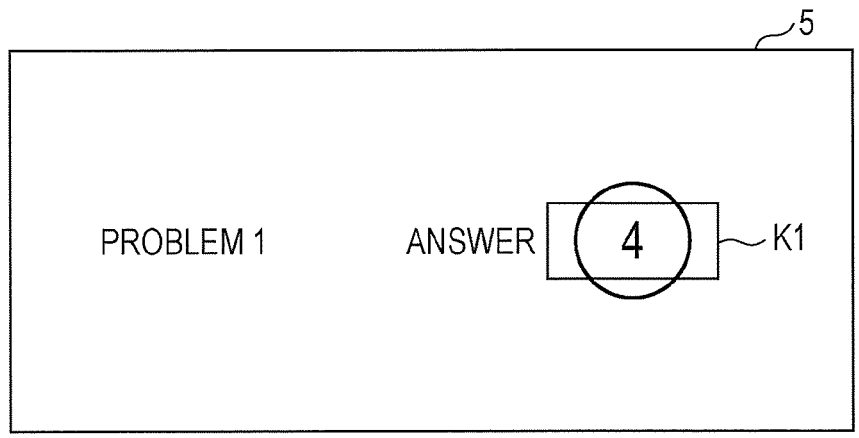
FIG. 9 illustrates an example of a display of determination results of an answer column.

In step S304, the controller 28 performs control to display on the display 5 the determination results received in step S114 in FIG. 3. If the answer to a problem 1 is determined to be correct as illustrated in FIG. 9, an image having a blank circle representing the correct answer is displayed in the answer column K1. In this case, the answer to the problem 1 is displayed first and then the image having the blank circle is displayed on the answer. Alternatively, the image having the blank circle is gradually drawn in animation. In this way, the determination results may be displayed instantly. Alternatively, the determination results may be gradually qdisplayed in motion-sensitive animation such that the user feels elation until the determination results are fully visible. The region of the answer column K1 may be displayed in enlargement. The user may thus easily recognize the determination results.

Figure 10:
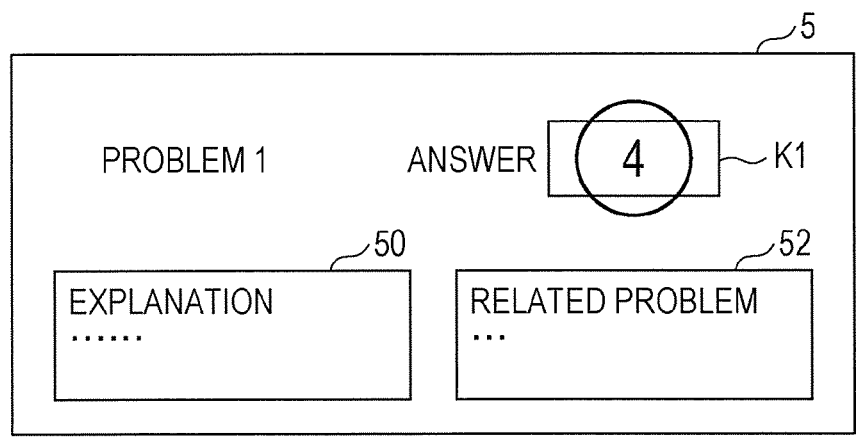
FIG. 10 illustrates an example of a display of the determination results of the answer column.

In step S306, the controller 28 performs control to display on the display 5 at least one of an explanation of the correct answer information and a problem related to the correct answer information. The explanation of the correct answer information describes the correct answer. The explanation of the correct answer information includes at least one of an explanation of the problem and a hint of how to address the problem. Referring to FIG. 10, an explanation 50 concerning the correct answer information to a problem 1 is displayed on the display 5 and the problem 52 related to the correct answer information to the problem 1 is also displayed on the display 5. Only the explanation concerning the correct answer information may be displayed or only the problem related to the correct answer information may be displayed on the display 5.

When at least one of the explanation of the correct answer information and the problem related to the correct answer information is displayed on the display 5, the controller 28 may perform control to set the display time for the incorrect answer to the problem to be longer than the display time for the correct answer. Referring to FIG. 10, the answer to the problem 1 is correct. If the answer to the problem 1 is incorrect, the display time for the explanation 50 and the related problem 52 is set to be longer than when the answer is correct. In this way, the problem to which the user has given the incorrect answer may be understood more.

When at least one of the explanation of the correct answer information and the problem related to the correct answer information is displayed on the display 5, all or part of the problems may be displayed. If part of the problems is displayed, at least one of the explanation of the correct answer information and the problem related to the correct answer information is displayed for the problem to which the user has given an incorrect answer or a partially incorrect answer. In other words, the explanation of the correct answer information and the problem related to the correct answer information may be displayed for the problem to which the user has given a correct answer.

When at least one of the explanation of the correct answer information and the problem related to the correct answer information is displayed on the display 5, the display of the explanation may be automatically switched from the current problem to the next problem every constant period of time. Alternatively, the display of the explanation may be switched from the current problem to the next problem each time the user performs a switching operation.

If the display of the explanation is automatically switched from the current problem to the next problem every constant period of time, the display time may be set to be different between the problem with the correct answer and the problem with the incorrect answer. The user may typically desire to take his or her time to study the explanation about the problem with the incorrect answer. The display time for the explanation of the problem with the incorrect answer may be set to be longer than the display time for explanation of the problem with the correct answer.

If the time to determine all the answer columns does not exceed the predetermined time, the controller 28 may perform control not to display the explanation of the correct answer information and the problem related to the correct answer information.

The explanation 50 and the related problem 52 in FIG. 10 may be too large to fall within one screen. In such a case, the explanation 50 and the related problem 52 may be displayed together by performing an operation to move a region where the explanation 50 and the related problem 52 are displayed, for example, by performing a scroll operation. In such a case, if the explanation 50 and the related problem 52 are displayed in the entire display 5 with the determination results of the answer columns hidden, they are more visibly recognizable.

Figure 11:
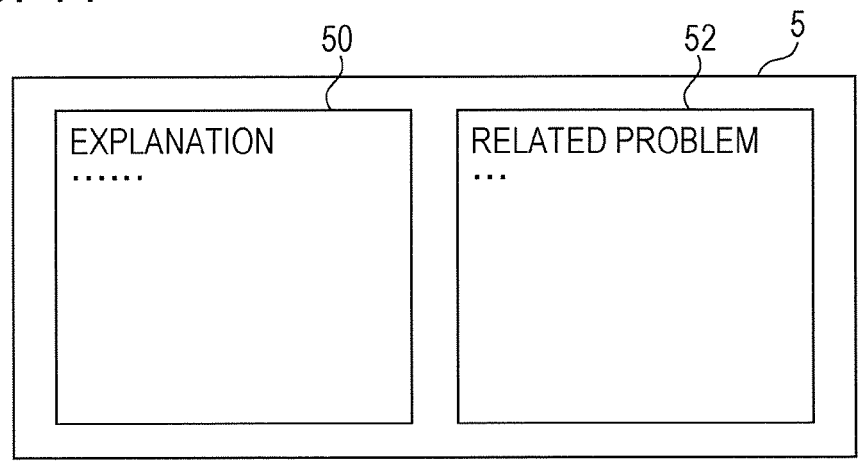
FIG. 11 illustrates an example of a display of the determination results of the answer column.

When at least one of the explanation of the correct answer information and the problem related to the correct answer information is displayed on the display 5, a scroll operation may be performed to move the region where at least one of the explanation of the correct answer information and the problem related to the correct answer information is displayed. In such a case, at least one of the explanations of the correct answer information and the problem related to the correct answer information may be displayed with the determination results of the answer columns hidden. As illustrated in FIG. 11, the explanation 50 and the related problem 52 are displayed on the entire display 5. In this way, the explanation 50 and the related problem 52 are more visibly recognizable.

In step S308, the controller 28 determines whether the print time calculated in step S108 in FIG. 3 exceeds the predetermined time. The predetermined time is set such that the user feels like the waiting time to the end of the printing is too long if the waiting time exceeds the predetermined time.

If the print time exceeds the predetermined time, processing proceeds to step S310. If the print time is equal to or shorter than the predetermined time, the routine ends and processing returns to step S112 in FIG. 3 to determine the next answer column.

In step S310, the controller 28 performs control to display an indication that the determination results are not printed. The user thus learns that the printing is not performed.

In step S312, the controller 28 performs control to print, on a paper sheet, information related to the answer column serving as a determination target. Specifically, the controller 28 acquires information related to the test having the test number acquired in step S102 by referencing the test information 34 stored on the memory 7. As previously described, the related information includes at least one of another problem related to the problem, application problem, and description of how to address the problem. The controller 28 controls the printing unit 3 to print the related information acquired to the paper sheet. If the printing takes longer than the predetermined time, the determination results are not printed. Prior to notifying the determination end information, the printing unit 3 prints on the paper sheet the information related to the answer sheet serving as a determination target.

The answer sheet with the re-answer column added may be printed and the user may provide an instruction to score again the answer sheet having an answer written on a re-answer column. In step S110 in FIG. 3, the instruction unit 22 may provide an instruction to perform at least one of the correct answer and the incorrect answer in the added answer column. Only the added answer column is thus determined. The scoring time is short in comparison with the case in which the answers of all the problems are scored.

In the exemplary embodiment, the image forming apparatus 1 includes the scoring unit 30. Alternatively, the scoring unit 30 may be arranged in an external apparatus and scoring results may be received from the external apparatus.

In accordance with the exemplary embodiment, the test information 34 including the correct answer information is stored on the memory 7 in the image forming apparatus 1. Alternatively, the test information 34 may be stored on an external apparatus and the test information 34 may then be acquired from the external apparatus.

In accordance with the exemplary embodiment, the remaining time to the end of the printing, the determination results of the answers, the explanation of the correct answer information, and the problem related to the correct answer information are displayed on the display 5. These pieces of information may be displayed not only on the display 5 but also on a portable terminal of the user, such as a smart phone or a tablet terminal. Alternatively, these pieces of information may be displayed on the portable terminal in place of the display 5. Part of the information may be displayed on the display 5 while the rest of the information may be displayed on the portable terminal. Specifically, ordinary information may be displayed on the display 5 while information about the determination results which the user may desire to keep private may be displayed on the portable terminal. The portable terminal is typically viewed by the user themselves only. The information about the determination results which the user may desire to keep private is displayed on the portable terminal and is thus free from being glanced by someone else. Specifically, the remaining time to the end of the printing is displayed on the display 5 and the determination results of the problems, the explanation of the correct answer information, and the problem related to the correct answer information may be displayed on the portable terminal.

In accordance with the exemplary embodiment, the determination results of the problems are displayed on the display 5 in the order of determination time from shorter to longer time. Alternatively, part of the determination results may be displayed on the display 5. For example, only the determination results of the correct answers or the incorrect answers may be displayed. Only the determination results of specific problems may be displayed. The determination results may be displayed with a predetermined number of problems skipped.

In accordance with the exemplary embodiment, the determination results of the answer columns are displayed on the display 5 to the user. An audio output function may be provided on the image forming apparatus 1. In addition to or in place of displaying the determination results on the display 5, the determination results may be output in voice to the user. For example, a voice message "The answer to the first problem is correct" may be output. An illumination device may be mounted on the image forming apparatus 1. The user may be notified by lighting the illumination device when the scoring operation is complete. Optionally, the determination results may be emailed to the portable terminal of the user.

In accordance with the exemplary embodiment, the disclosure is applied to the image forming apparatus 1. The disclosure may be applied to a portable terminal having a camera function, such as a smart phone or a tablet terminal. In such a case, the image of the answer sheet is acquired by photographing the answer sheet with the camera and then the processes in FIGS. 3 through 5 are performed on the image.

The scoring processes illustrated in FIGS. 3 through 5 may be implemented by using hardware, such as application specific integrated circuit (ASIC). In such a case, the scoring processes may be sped up more than when the scoring process are implemented by using software.

In accordance with the exemplary embodiment, the scoring program 32 is installed on the memory 7. The disclosure is not limited to this arrangement. The scoring program 32 of the exemplary embodiment may be supplied in a recorded form on a non-transitory computer readable medium. The information processing program of the exemplary embodiment may be supplied in a recorded form on an optical disk, such as a compact disk read-only memory (CD-ROM) or a digital versatile disk (DVD) ROM, or a semiconductor memory, such as a universal serial bus (USB) memory or a memory card. The scoring program related to the exemplary embodiment may be acquired from an external device via a communication network connected to the communication unit 6.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A scoring apparatus, comprising:
a processor configured to,
acquire an image that is read from a recording medium having an answer column,
provide an instruction to perform a determination on at least one of a correct answer and an incorrect answer from correct answer information related to the recording medium and answer information included in the image acquired,
receive determination end information indicating that the determination has ended and determination results on each answer column that has undergone the determination, and
perform a notification of the determination end information received; the processor comprising:
a controller that performs control to display, before the notification unit has performed the notification, the determination results on the answer column that has undergone the determination, wherein if overall time taken to determine all the answer columns does not exceed a predetermined time, the controller performs control not to display the determination results for an answer column taking a determination time longer than a predetermined threshold value from among the answer columns.

2. The scoring apparatus according to claim 1, wherein the controller performs control to display the determination results in an order of types of the answer columns from a type taking a shorter determination time to a type taking a longer determination time.

3. The scoring apparatus according to claim 2, wherein the controller performs control to display the determination results and at least one of an explanation of the correct answer information and a problem related to the correct answer information.

4. The scoring apparatus according to claim 3, wherein when the determination results and the at least one of the explanation of the correct answer information and the problem related to the correct answer information are displayed, the controller performs control such that a display time of an incorrect answer is longer than a display time of a correct answer.

5. The scoring apparatus according to claim 3, wherein if an overall time taken to determine all the answer columns does not exceed a predetermined time, the controller performs control not to display the explanation of the correct answer information and the problem related to the correct answer information.

6. The scoring apparatus according to claim 1, wherein the controller performs control to display the determination results and at least one of an explanation of the correct answer information and a problem related to the correct answer information.

7. The scoring apparatus according to claim 6, wherein when the determination results and the at least one of the explanation of the correct answer information and the problem related to the correct answer information are displayed, the controller performs control such that a display time of an incorrect answer is longer than a display time of a correct answer.

8. The scoring apparatus according to claim 6, wherein if overall time taken to determine all the answer columns does not exceed a predetermined time, the controller performs control not to display the explanation of the correct answer information and the problem related to the correct answer information.

9. The scoring apparatus according to claim 6, wherein the controller performs control not to display the determination results if an operation is performed to move a region where the at least one of the explanation of the correct answer information and the problem related to the correct answer information is displayed.

10. The scoring apparatus according to claim 1, further comprising a printing unit that prints the determination results received,
wherein the controller performs control not to print the determination results if time taken to end printing of the determination results exceeds predetermined time.

11. The scoring apparatus according to claim 10, wherein if the time taken to end the printing of the determination results exceeds the predetermined time, the controller performs control not to print the determination results and performs control to print, on the recording medium, information related to the recording medium that serves as a target for the determination before the determination end information is notified.

12. The scoring apparatus according to claim 1, further comprising a printing unit that prints the determination results received,
wherein the controller performs control to additionally print an answer column of the incorrect answer on the recording medium.

13. The scoring apparatus according to claim 12, wherein the processor is configured to provide an instruction to perform the determination on at least one of the correct answer and the incorrect answer in only the answer column added.

14. A non-transitory computer readable medium storing a program causing a computer to execute a process for scoring, the process comprising:
acquiring an image that is read from a recording medium having an answer column;
providing an instruction to perform a determination on at least one of a correct answer and an incorrect answer from correct answer information related to the recording medium and answer information included in the acquired image;
receiving determination end information indicating that the determination has ended and determination results on each answer column that has undergone the determination;
performing a notification of the determination end information received; and
performing control to display, before the notification, the determination results on the answer column that has undergone the determination, wherein if overall time taken to determine all the answer columns does not exceed a predetermined time, the non-transitory computer readable medium causes the computer to perform control not to display the determination results for an answer column taking a determination time longer than a predetermined threshold value from among the answer columns.

* * * * *